(12) United States Patent
Brown

(10) Patent No.: US 12,646,920 B2
(45) Date of Patent: Jun. 2, 2026

(54) HYBRID FAULT PROTECTION CIRCUITS FOR HIGH-POWER CYCLICAL LOADS

(71) Applicant: Komatsu America Corp., Chicago, IL (US)

(72) Inventor: Gerald Murray Brown, Cedarville, OH (US)

(73) Assignee: Terminal Power LLC, Cedarville, OH (US)

( * ) Notice: Subject to any disclaimer, the term of this patent is extended or adjusted under 35 U.S.C. 154(b) by 320 days.

(21) Appl. No.: 18/418,928

(22) Filed: Jan. 22, 2024

(65) Prior Publication Data

US 2024/0250516 A1 Jul. 25, 2024

Related U.S. Application Data

(60) Provisional application No. 63/440,581, filed on Jan. 23, 2023.

(51) Int. Cl.
H02H 3/08 (2006.01)
H02H 1/00 (2006.01)
(52) U.S. Cl.
CPC ............. H02H 3/08 (2013.01); H02H 1/0007 (2013.01)
(58) Field of Classification Search
CPC ........ H02H 3/08; H02H 1/0007; H02H 7/268; B60L 2200/26; B60L 3/04
See application file for complete search history.

(56) References Cited

U.S. PATENT DOCUMENTS

| | | | |
|---|---|---|---|
| 5,274,349 A | 12/1993 | Hassler et al. | |
| 8,614,618 B2 | 12/2013 | Darr et al. | |
| 10,529,521 B2 | 1/2020 | De Palma et al. | |
| 11,052,784 B2 * | 7/2021 | Mensch ................. | B60L 58/21 |
| 2010/0165526 A1 * | 7/2010 | Dishman ............... | H02H 9/026 |
| | | | 361/58 |
| 2011/0090607 A1 | 4/2011 | Luebke et al. | |

(Continued)

FOREIGN PATENT DOCUMENTS

WO 199835237 A2 8/1998

OTHER PUBLICATIONS

International Search Report and Written Opinion of the ISA issued in PCT/US2024/12498, mailed May 6, 2024; ISA/US.

*Primary Examiner* — Scott Bauer
*Assistant Examiner* — Nicolas Bellido
(74) *Attorney, Agent, or Firm* — FBT Gibbons LLP

(57) ABSTRACT

A hybrid fault protection circuit (HFPC) includes an input, an output, a resistor-fuse circuit, an electrically-controlled safety switching device (ESSD) and an overload protection module (OPM). The input receives power from a power source. The output outputs power to a high-power cyclical load. The resistor-fuse circuit includes a resistor and one or more fuses collectively being connected in series with the resistor. The ESSD includes a coil and contacts. The contacts are connected in parallel with the resistor-fuse circuit. The OPM: arms the HFPC by energizing the coil and closing the contacts to supply load current from the input to the output via the contacts when a fault downstream from the HFPC does not exist; detects a fault downstream from the HFPC; and, in response to detecting the fault, opens the contacts to cause fault current to pass through the one or more fuses and not across the contacts.

20 Claims, 5 Drawing Sheets

(56)         References Cited

U.S. PATENT DOCUMENTS

| 2015/0138683 | A1* | 5/2015 | Sim | H02H 3/08 |
| | | | | 361/93.9 |
| 2019/0140245 | A1 | 5/2019 | Mensch et al. | |
| 2019/0149063 | A1* | 5/2019 | Onda | B60L 3/12 |
| | | | | 361/30 |
| 2022/0013308 | A1 | 1/2022 | Fleureau et al. | |
| 2022/0166233 | A1 | 5/2022 | Pizzurro et al. | |
| 2022/0246377 | A1 | 8/2022 | Gerlaud et al. | |

* cited by examiner

HYBRID FAULT PROTECTION CIRCUITS FOR HIGH-POWER CYCLICAL LOADS

CROSS-REFERENCE TO RELATED APPLICATIONS

This application claims the benefit of U.S. Provisional Application No. 63/440,581, filed on Jan. 23, 2023. The entire disclosures of the applications referenced above are incorporated herein by reference.

FIELD

The present disclosure relates to fault protection circuits.

BACKGROUND

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

A high-voltage power supply system used to supply power from overhead trolley lines to high-voltage electric vehicles can include multiple substations. The substations supply power to the overhead trolley lines, which in turn supply direct current (DC) power to the high-voltage vehicles. A power supply system in each of the vehicles may include, for example, one or more power sources such as an engine, a trolley power circuit, and/or one or more battery packs providing DC power to DC bus bars. A trolley power circuit refers to a circuit for conveying DC voltage on overhead trolley lines to a DC voltage across the DC bus bars. One or more inverters convert the DC voltage across the DC bus bars to one or more alternating current (AC) voltages, which are supplied respectively to one or more loads on the vehicle. The loads may include motors, fans, brake choppers, etc.

SUMMARY

A hybrid fault protection circuit is disclosed and includes an input, an output, a resistor-fuse circuit, an electrically-controlled safety switching device and an overload protection module. The input is configured to receive power from a power source. The output is configured to output power to one or more high-power cyclical loads. The resistor-fuse circuit includes one or more resistors and one or more fuses collectively being connected in series with the one or more resistors. The electrically-controlled safety switching device includes a coil and contacts. The contacts are connected in parallel with the resistor-fuse circuit. The overload protection module is configured to: arm the hybrid fault protection circuit by energizing the coil and closing the contacts to supply load current from the input to the output via the contacts when a fault downstream from the hybrid fault protection circuit does not exist; detect a fault downstream from the hybrid fault protection circuit; and, in response to detecting the fault, open the contacts to cause fault current to pass through the one or more fuses and not across the contacts.

In other features, the one or more resistors includes multiple resistors.

In other features, impedance of the resistor-fuse circuit is higher than impedance of the contacts when closed such that a majority of current passing from the input to the output passes through the contacts when closed.

In other features, impedance of the resistor-fuse circuit is higher than impedance of the contacts when closed such that 95% or more of current passing from the input to the output passes through the contacts when closed.

In other features, the electrically-controlled safety switching device is implemented as a circuit breaker, a contactor, or a fast mechanical switch.

In other features, the one or more fuses include multiple fuses connected in parallel.

In other features, the hybrid fault protection circuit further includes one or more current sensors configured to detect at least one of source current from the input and contact current through the contacts. The overload protection module is configured, based on the at least one of the source current from the input and the contact current through the contacts, to detect the fault.

In other features, a melt time of the one or more fuses is longer than at least one of i) time for the contacts to separate further than a minimum arc restrike distance (ARD), and ii) time for the overload protection module to cause the contacts to separate further than the minimum ARD.

In other features, the overload protection module is configured, subsequent to detecting the fault and causing the contacts to separate beyond the minimum ARD, to determine whether to operate in a limp mode, and in response to determining to operate in the limp mode, reclose the contacts.

In other features, a machine is disclosed and includes: a DC link including multiple DC link rails; the hybrid fault protection circuit, where the output of the hybrid fault protection circuit is connected to the DC link; and the one or more high-power cyclical loads receiving power from the DC link. In other features, the machine further includes one or more power sources supplying power to the DC link. In other features, the one or more power sources include at least one of an engine and a power storage module. In other features, the machine further includes a trolley pantograph connected to the input and configured to receive power from overhead trolley lines.

In other features, a power supply system is disclosed and includes: the hybrid fault protection circuit; and one or more substations supplying power to the input of the hybrid fault protection circuit via overhead trolley lines.

In other features, a vehicle is disclosed and includes: the hybrid fault protection circuit; the power source supplying power to the hybrid fault protection circuit; and the one or more high-power cyclical loads receiving power from the output of the hybrid fault protection circuit. In other features, the power source is an engine, a power storage module or a trolley pantograph.

In other features, a method of operating a hybrid fault protection circuit is disclosed. The method includes arming the hybrid fault protection circuit, where the hybrid fault protection circuit includes an electrically-controlled safety switching device connected in parallel with a resistor-fuse circuit, the electrically-controlled safety switching device includes a coil and contacts, and the resistor-fuse circuit includes one or more resistors collectively connected in series with one or more fuses. The arming of the hybrid fault protection circuit includes energizing the coil to close the contacts and supply load current through the contacts to one or more high-power cyclical loads. The method further includes: detecting at least one parameter of the hybrid fault protection circuit; comparing the at least one parameter to at least one threshold to detect a fault downstream from the hybrid fault protection circuit; and in response to detecting the fault, opening the contacts of the electrically-controlled safety switching device to cause fault current to pass through the one or more fuses and not across the contacts.

In other features, the at least one parameter includes at least one of source current and current through the contacts.

In other features, the at least one threshold includes a current threshold and an energy threshold.

In other features, the method further includes: detecting source current supplied to the hybrid fault protection circuit; based on the detected source current, determining whether the one or more fuses are blown; and in response to detecting the one or more fuses are blown, operating in a limp mode including closing the contacts to allow current to pass from an input of the hybrid fault protection circuit to an output of the hybrid fault protection circuit.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

Figure 1:
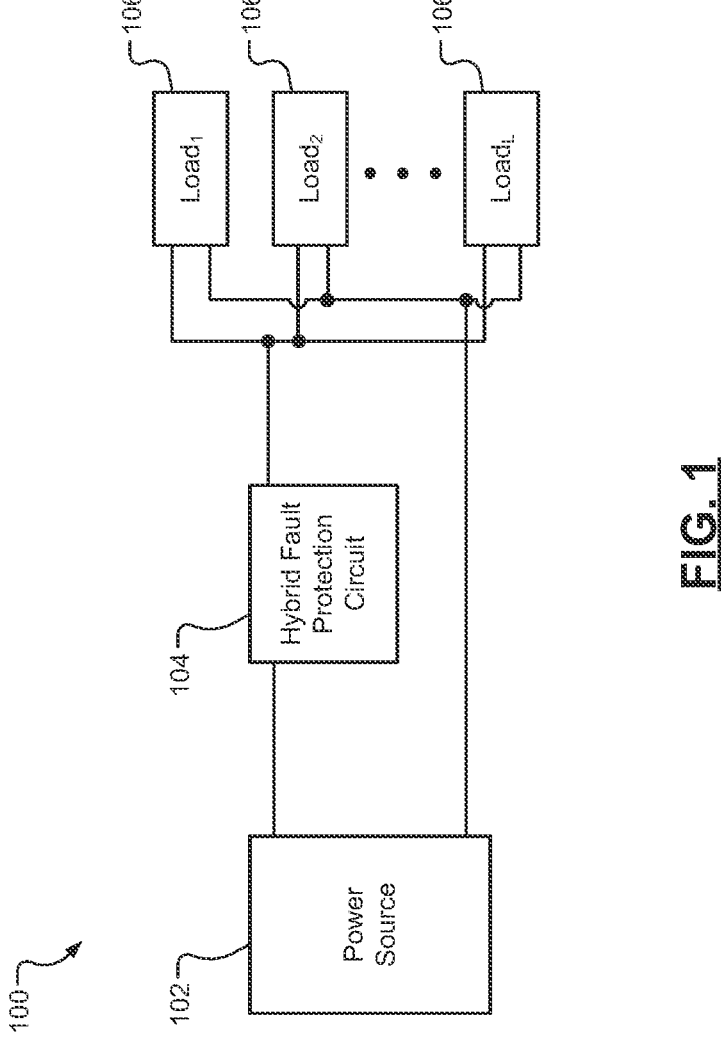
FIG. 1 is a functional block diagram of an example power supply system including a hybrid fault protection circuit (HFPC) in accordance with the present disclosure.

Electric vehicles (EVs), sometimes referred to as zero emission vehicles, can include low-voltage drive systems (e.g., 800 volts (V) or less drive systems). EVs with low-voltage drive systems include low-voltage energy storage modules (ESMs), such as battery packs and/or fuel cells providing up to 800V. Traditional EVs are used in automobiles by individual consumers and businesses for small, lightweight and low loading applications. Zero emission vehicles can also be implemented in mining and construction environments. Mining and construction vehicles tend to be large, heavy and have high-power and high DC voltage requirements (e.g., 2800 V). As an example, mining and construction vehicles may receive DC power from overhead DC power lines capable of supplying 2800 V over extended periods of time.

High power DC loads, such as mining and construction vehicles receiving power from overhead trolley lines, can be protected against faults using fuses or circuit breakers (CBs). A fault can occur, for example, when a load experiences a short circuit, such as when DC bus lines are shorted together or to ground. This can cause an inrush of current from one or more power sources to the location of the short circuit.

During normal operation, if a load has large, slow, repetitive variations in power, fuses can experience large current and temperature swings that result in short fuse lifetimes. This is referred to as thermal cycling of fuses due to large cyclical loading. Multiple fuses can be connected in parallel to reduce the current and temperature swings of each fuse and thus the thermal stress on the fuses. Although this increases the lifetime of the fuses, a large amount of fault current is needed to blow the fuses. When the fault (or "let-through") current is high enough to blow the fuses, components of the corresponding circuit and/or downstream loads can be damaged. Thus, in some cases a protection circuit consisting of fuses is not a viable option.

High-power high-speed CBs can be used instead of fuses to quickly interrupt fault current. However, high-power high-speed CBs tend to be expensive, heavy, bulky, and require spatial clearance between the CBs and other surrounding vehicle components. For example, high-power high-speed CBs cannot be simply placed in a cabinet, because arcing can occur between the CBs and the cabinet in the event of a fault. In addition, due to inductances of a CB, power lines, transformers, reactors, etc., when a fault occurs, the opening contacts of the CB will experience arcing until the inductive energy associated with the fault has dissipated. In order for the CBs to handle the arcing, the CBs have large arc chutes, which can take up considerable space. Vehicles tend to have a small amount of available space for a protection circuit. Due to the associated expense, weight, size and spacing requirements, high-power high-speed CBs in some cases are not a practical and/or feasible option for a vehicle.

The examples set forth herein include HFPCs that are configured to protect high-power cyclical loads and other circuitry against faults, such as short circuits. Each of the HFPCs includes one or more fuses and an electrically-controlled safety switching device (ESSD), such as a CB, a contactor, or a fast mechanical switch (FMS). Contacts of an ESSD may be electronically, hydraulically, or pneumatically actuated. The HFPCs are configured to exhibit the advantages of fuses and ESSDs while eliminating the disadvantages of fuses and ESSDs. Each HFPC includes one or more balancing resistors connected in series with one or more fuses, referred to as the resistor-fuse circuit. The resistor-fuse circuit is connected in parallel with an ESSD. The fuses interrupt fault current (referred to as "clearing the fault"). The ESSD shields the fuses from high-power load cycling. The ESSD carries the load current during normal operation when a fault does not exist, which eliminates thermal fatigue in the fuses and makes selection of the fuses easier. The fuses are low resistance fuses that are able to withstand a full system voltage. The ESSD is a low-cost high-speed device that is configured to initiate transfer of current to the fuses in the event of a fault. The stated HFPCs prevent ESSDs from experiencing high-voltage arcing during a fault.

The configuration of each HFPC allows for elimination of an arc chute. During a fault event and a melting pre-arc phase of the fuses of an HFPC, there is minimal voltage across the fuses. The ESSD of the HFPC opens contacts of the ESSD without arcing. This allows the ESSD to be implemented as a simple low-cost low-voltage high-speed CB, contactor, or fast mechanical switch. In certain applications, an HFPC is able to be used instead of pyrotechnic circuit breakers.

The described HFPCs disclosed are reliable, compact, and low-cost circuits that clear fault currents and prevent damage to equipment. The HFPCs disclosed herein require less space than conventional high-speed, high-power CBs and provide reliable fault protection with a minimal number of fuses and a low-power ESSD. The fuses are not difficult to define, as further described below. The HFPCs are also easy to test and, when implemented in a vehicle, allow the vehicle to operate in a limp mode in the event of a fault. During the limp mode, the vehicle may for example, drive to a maintenance shop at a reduced speed and current to be serviced.

FIG. 1 shows an example power supply system 100 that includes a power source 102, an HFPC 104 and loads 106. The power source 102 may include: one or more substations; overhead trolley lines; an internal combustion engine with a traction alternator and a rectifier; one or more energy storage modules; bus bars; etc. The power source 102 may be implemented separate from a machine and supply power to the machine or may be implemented on the machine. The machine may be, for example, a conveyor, a crusher, a vehicle, a haul truck, a roller mill, a surface mining truck, an underground mining truck, a battery powered vehicle, a rock hauler, a hybrid mine loader, a trolley assisted machine, an off-highway truck, etc. The power source 102 may be a DC or an alternating current (AC) power source. The loads 106 may be DC or AC loads.

The HFPC 104 is configured to protect components of the HFPC 104 and the loads 106 from surges in current due to a fault. The fault may for example, be a short circuit downstream from the HFPC 104. The HFPC 104 may function with DC or AC load and fault currents. Examples of the HFPC 104 and implementations thereof are shown and described with respect to FIGS. 2-5.

Each of the loads may be a machine, a vehicle, or a load on a machine or a vehicle. Each load may be an industrial load. In one embodiment, the power source 102 is supplying power via overhead trolley lines to multiple machines and/or vehicles. In another embodiment, the power source 102 is implemented on a machine and/or vehicle and is supplying power to multiple loads on the machine and/or vehicle. Each of the loads experiences high power cycling and thermal fuse cycling. The loads may operate at full power, power off, and then power back on and repeat this cycle, and thus are referred to as cyclical loads. When on a machine and/or a vehicle, the loads may include fans, motors, storage drives, etc. Each of the loads may be a DC or an AC load.

Figure 2:
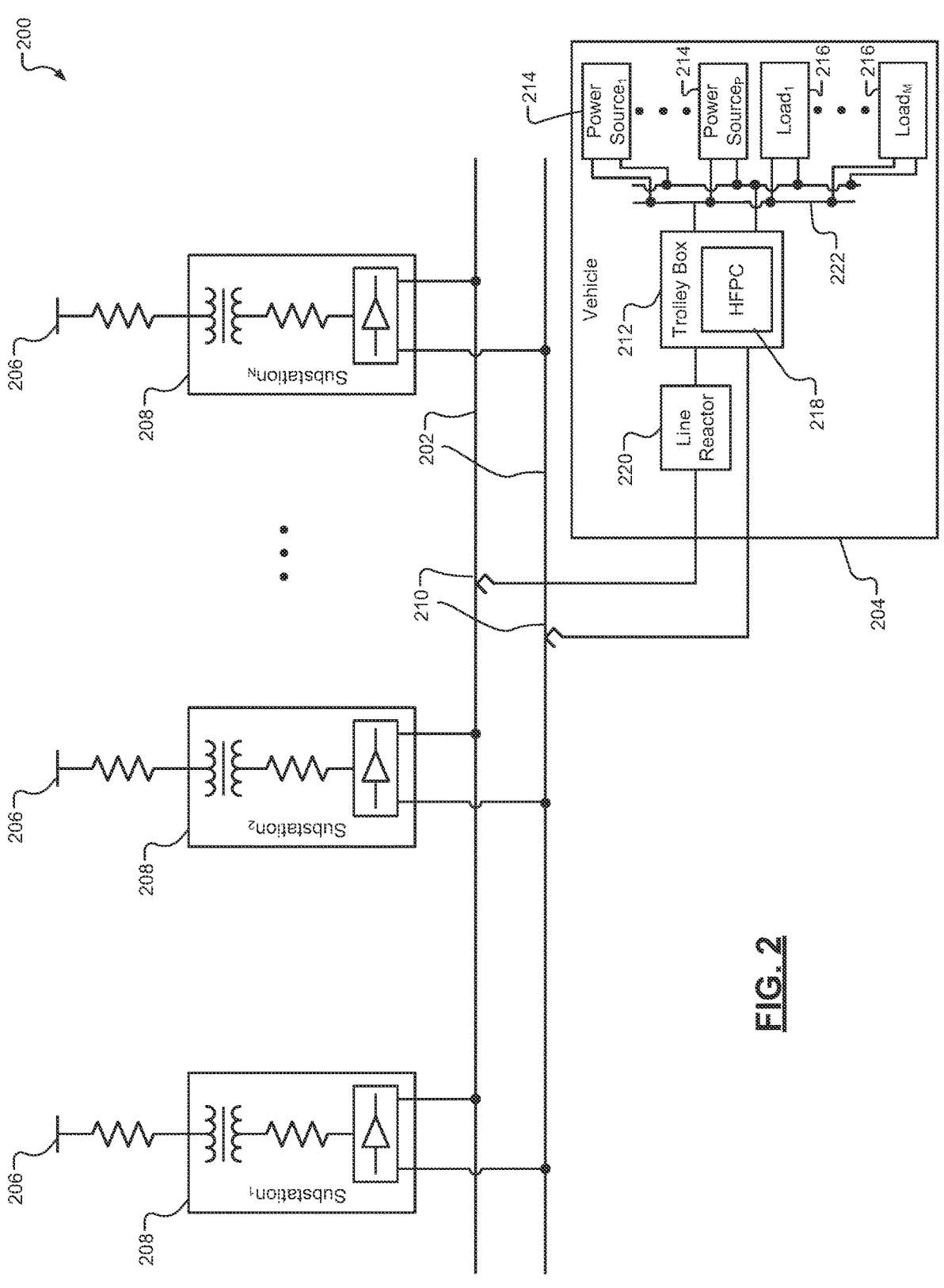
FIG. 2 is a functional block diagram of an example power supply system providing power via overhead trolley lines to a vehicle including an HFPC in accordance with an embodiment of the present disclosure.

FIG. 2 shows a power supply system 200 providing power via overhead trolley lines 202 to a vehicle 204. Power source line terminals 206 supply power to substations 208, which in turn supply power to the overhead trolley lines 202. A trolley pantograph 210 receives power from the overhead trolley lines 202 and provides the power to the vehicle 204.

The vehicle 204 may include a line reactor 220, a trolley box 212, power sources 214 and loads 216. The trolley box 212 includes an HFPC 218. The line reactor 220 prevents interference between DC link voltages (or capacitor voltages) on a DC link 222 of the vehicle 204 and DC link voltages of other power supply systems connected to the overhead trolley lines 202. The other power supply systems may be implemented, for example, within other respective vehicles.

The trolley box 212 allows the trolley pantograph 210 to remain in contact with overhead trolley lines 202 and connect or disconnect the DC link 222 from the overhead trolley lines 202 in a safe quick manner. The trolley box 212 may include the HFPC 218 alone or the HFPC 218 in combination with other circuit components, such as one or more fuses, circuit breakers, sensors (e.g., voltage and current sensors), switches, etc. The sensors may be used to assure that the trolley line voltage is within a predetermined range prior to connecting the DC link 222 to the overhead trolley lines 202 to prevent a surge of current to/from the overhead trolley lines 202 from/to the DC link 222. The HFPC 218 and any included switches of the trolley box 212 may be used for connecting the DC link 222 to and disconnecting the DC link 222 from the trolley pantograph 210 and thus the overhead trolley lines 202. Examples of the HFPC 218 are described below with respect to FIGS. 4-5.

The power sources 214 may include: an internal combustion engine with a traction alternator and rectifier; one or more energy storage modules; etc. supplying power to the DC link 222. The loads may include high-power cyclical loads, low-power cyclical loads, and non-cyclical loads and receive power from the DC link 222.

Figure 3:
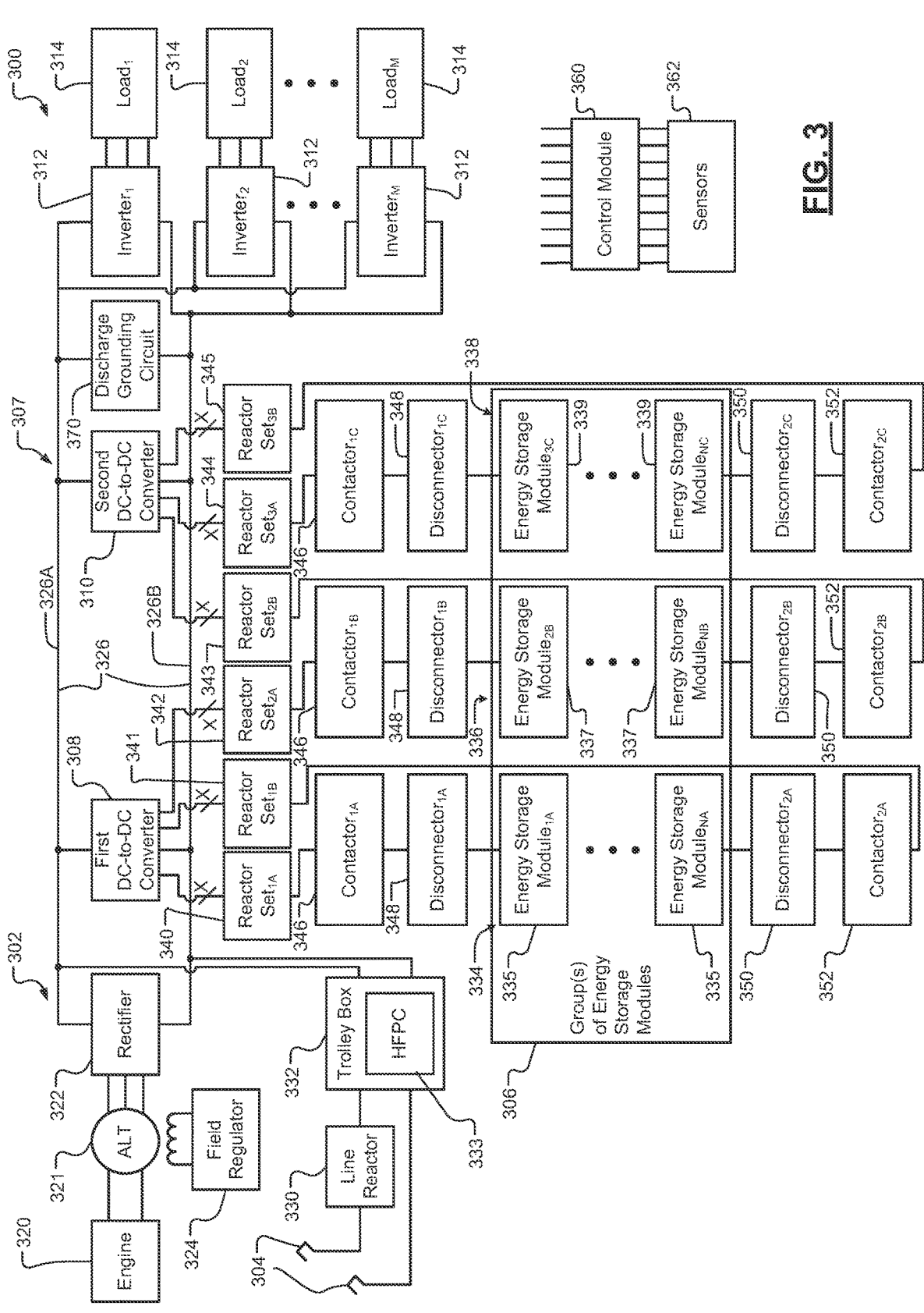
FIG. 3 is an example power supply system of a vehicle including an HFPC in accordance with an embodiment of the present disclosure.

FIG. 3 shows an example power supply system 300 of a vehicle that includes multiple power sources 302, 304, 306, a conversion circuit 307 including multiple 2-level buck-boost DC-to-DC converters 308, 310 (referred to as the DC-to-DC converters 308, 310), and multiple inverters 312 connected to respective loads 314 which may be regenerative capable. The power sources 302, 304, 306 are example power sources and may be replaced with other power sources. In the example shown, the power source 302 is implemented with an engine 320, an alternator 321 and a rectifier 322.

The power source 304 is implemented as a trolley pantograph. The power source 306 is implemented as a group (or groups) of energy storage modules (ESMs). The engine 320 is connected to an alternator 321, which supplies AC power to a rectifier 322. A field regulator 324 regulates voltage out of the alternator 321. The rectifier 322 outputs a DC voltage on a DC link 326 having DC rails 326A, 326B. The rectifier 322 is an AC-to-DC rectifier. The DC link 326 may be referred to as a DC bus having bus bars (or DC rails) 326A, 326B. The DC rails 326A, 326B may each be positive or negative, such that there is one positive rail and one negative rail, two positive rails or two negative rails.

The trolley pantograph 304 receives DC power from overhead trolley lines and supplies the DC power to a line reactor 330 and a trolley box 332. The line reactor 330 prevents interference between DC link voltages (or capacitor voltages) on the DC link 326 of the power supply system 300 and DC link voltages of other power supply systems connected to the overhead trolley lines. The power supply system 300 may be implemented for a host vehicle and the other power supply systems may be implemented within other respective vehicles.

The trolley box 332 allows the trolley pantograph 304 to remain in contact with the overhead trolley lines and connect or disconnect the DC link 326 from the overhead trolley lines in a safe quick manner. The trolley box 332 includes an HFPC 333 and may include other circuit components. The trolley box 332 may include one or more fuses, circuit breakers, sensors (e.g., voltage and current sensors), switches, etc. The sensors may be used to assure that the trolley line voltage is within a predetermined range prior to connecting the DC link 326 to the overhead trolley lines to prevent a surge of current to/from the overhead trolley lines from/to the DC link 326. The HFPC 333 and/or switches of the trolley box 332 may be used for connecting the DC link 326 to and disconnecting the DC link 326 from the trolley pantograph 304 and thus the overhead trolley lines.

The HFPC 333 protects components of the HFPC 333 and components and devices downstream from the HFPC 333 from surges in current due to faults downstream from the HFPC 333. As a few examples, a fault may refer to a short circuit: between the bus bars 326A, 326B; between the bus bar 326A and a ground reference; between the bus bar 326B and the ground reference; and/or between components downstream from the DC link 326. These types of faults, if not protected against, can cause an inrush of current from the trolley pantograph 304 through the trolley box 332 to the DC link 326 and/or to one or more loads resulting in damage to components and/or devices. The HFPC 333 interrupts the fault current. The HFPC 333 may protect against, for example, an inrush of 25,000-40,000 amperes (A) of current being passed from the trolley pantograph 304 to the DC link 326 to prevent damage to the DC-to-DC converters 308, 310, the inverters 312, and the loads 314. Examples of the HFPC 333 are described below with respect to FIGS. 4-5.

The group of ESMs 306 may include multiple sub-groups of ESMs. For example, each sub-group of ESMs may be connected to one or more of the DC-to-DC converters 308, 310. In the example shown, a first sub-group 334 of ESMs is connected to the first DC-to-DC converter 308 and include ESMs 335. A second sub-group 336 of ESMs is connected to both of the DC-to-DC converters 308, 310 and include ESMs 337. A third sub-group 338 of ESMs is connected to the second DC-to-DC converter 310 and include ESMs 339. The group of ESMs (or power source) 306, when discharging, source power to the DC link 326. The group of ESMs 306, when charging, may sink power received from (i) one or more of the power sources 302, 304, and/or (ii) one or more of the regenerative capable loads 314 via the corresponding ones of the inverters 312. The ESMs 335, 337, 339 and other ESMs disclosed herein may each include battery cells, fuel cells, switches, resistors, control circuits, etc. The ESMs 335, 337, 339 and other ESMs disclosed herein may instead of or in addition to battery cells or fuel cells, include pumps, light sources, heaters, and/or other DC loads and/or sources. The loads 314 may include motors, DC-to-DC choppers, auxiliary loads (e.g., fans), etc. Some of the loads 314 may be able to source power, such as motors operating in the second or fourth quadrant.

The conversion circuit 307 further includes reactor sets 340, 341, which are connected between the DC-to-DC converter 308 and the power source 306. Reactor sets 342, 343 are connected between the DC-to-DC converters 308, 310 and the power source 306. Reactor sets 344, 345 are connected between the DC-to-DC converter 310 and the power source 306. The reactor sets 340-345 may each be implemented as a respective set of one or more reactors (or inductors). Each reactor (or inductor) in each of the reactor sets 340-345 is connected to a respective phase of a corresponding one of the DC-to-DC converters 308, 310. First terminals of the reactors in each of the reactor sets 340-345 is connected to a respective phase of a corresponding one of the DC-to-DC converters 308, 310 via respective lines (e.g., lines X, where X is an integer greater than or equal to 1). Second terminals of the reactors in each of the reactor sets 340-345 are connected together and to, for example, the same contactor, disconnector or ESM group, depending on whether a contactor and/or a disconnector are connected between that reactor set and the corresponding ESM group. The inclusion of multiple reactors in the reactor sets 340-345 and corresponding phase legs allows for interleaved operation, as further described below. Interleaved operation may be provided for reactor sets of one or more ESM groups.

A first set of contactors 346 and a first set of disconnectors 348 may be connected between the reactor sets 340, 342, 344 and the power source 306. A second set of disconnectors

350 and a second set of contactors 352 may be connected between the power source 306 and the reactor sets 341, 343, 345.

The contactors 346, 352 may be electrically powered contactors and activated and deactivated by a control module 360 to connect the sub-groups 334, 336, 338 to and disconnect the sub-groups 334, 336, 338 from the DC link 326. The disconnectors 348, 350 are manual switches, which may be switched by personal for safety reasons to isolate the sub-groups 334, 336, 338 from the DC link 326.

Although three power sources 302, 304, 306 are shown as providing power to and/or being connected to the DC link 326, any number of power sources may provide power to and/or be connected to the DC link 326.

The DC-to-DC converters 308, 310 are two-way converters, such that during operation the DC-to-DC converters 308, 310 convert DC voltage across the sub-groups of ESMs 334, 336, 338 to a DC voltage on the DC link 326 and vice versa. The DC-to-DC converters may be replaced by, connected similarly and/or configured similarly as any of the DC-to-DC converters disclosed herein. The conversion circuit 307, in conjunction with the DC-to-DC converters 308, 310 and the reactor sets 340-345 has virtual grounds.

The power supply system 300 may include various sensors 362, such as current sensors, voltage sensors, temperature sensors, etc. As an example, current and voltage sensors may be used to detect: current through and voltages in the trolley box 332; current and voltages of the DC link 326; current and voltages of each of the ESMs 335, 337, 339; levels of current flowing to and from the reactor sets 340-345; etc. The control module 360 may control operation of the power source 302, states of switches in the trolley box 332, states of switches of the DC-to-DC converters 308, 310, states of the contactors 346, 352, etc. based on outputs of the sensors 362. The control module 360 may control the switches within the trolley box 332 based on outputs of sensors in the trolley box 332 to connect the DC link 326 to and/or disconnect the DC link 326 from the trolley pantograph 304 and thus the overhead lines. The control module 360 may control states, switching frequencies, and/or duty cycles of switches of the DC-to-DC converters 308, 310 to set voltages across the sub-groups 334, 336, 338. By controlling ON times of the switches of the DC-to-DC converters 308, 310, average output voltage of each phase leg can be adjusted to any voltage within a predetermined range (e.g., 0-800V). This is further described below.

A discharge grounding circuit 370 may be connected across the rails 326A, 326B. An example of the discharge grounding circuit is shown in FIG. 3 and may include discharge resistors for passively discharging the DC link 326 when power is turned off. The discharge grounding circuit 370 may be configured such that the mid-voltage of the DC link 326 is floating above, centered on, or floating below chassis ground.

Figure 4:
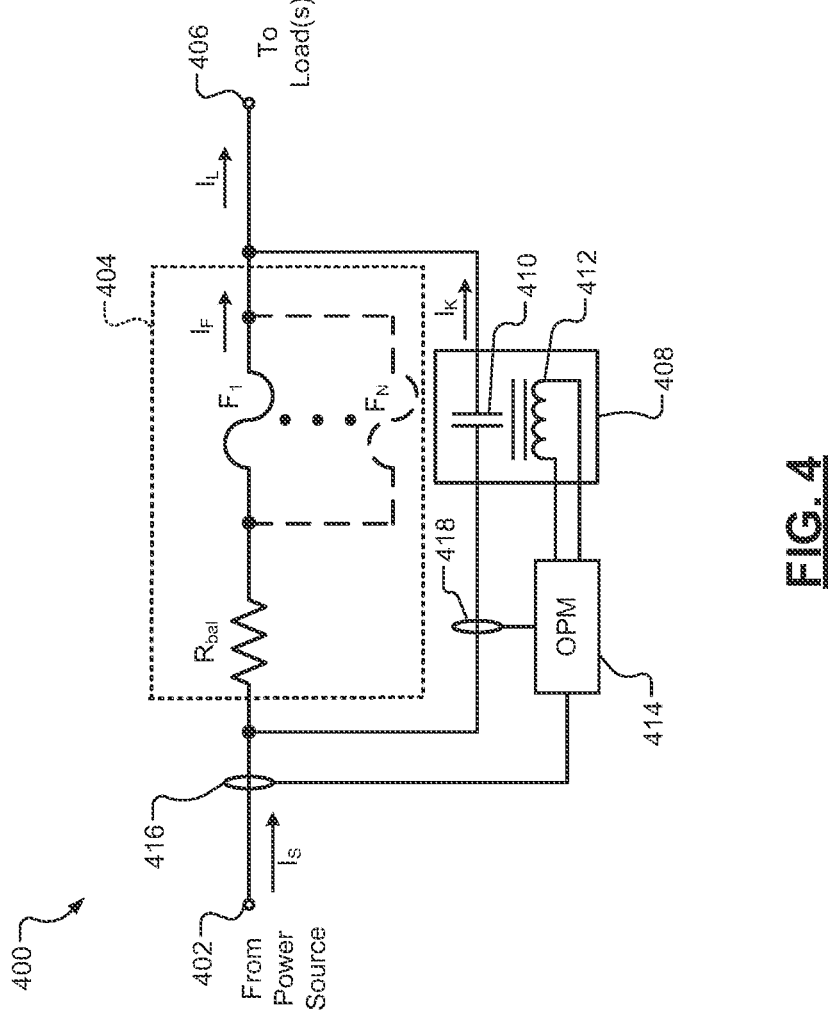
FIG. 4 is an example HFPC in accordance with an embodiment of the present disclosure.

FIG. 4 shows an example HFPC 400 that includes an input 402, a resistor-fuse circuit 404, an output 406, and a ESSD 408. The ESSD 408 is connected in parallel with the resistor-fuse circuit 404 between the input 402 and the output 406. The input 402 receives power from a power source (e.g., the power source of FIG. 1, the overhead trolley lines of FIG. 2, or other power source). The output 406 provides power to one or more loads (e.g., the loads of FIG. 1, the DC buses of FIGS. 2-3, or other load(s)). Current from the power source is represented as $I_S$. Current to the load(s) is represented as $I_L$.

The resistor-fuse circuit 404 includes one or more balance resistors (a single balance resistor $R_{bal}$ is shown) and one or more fuses (fuses $F_1$-$F_N$ are shown). The fuses are connected in parallel. The balance resistors increase the series resistance of the resistor-fuse circuit 404, such that the majority of current flows through the ESSD 408 instead of through the fuses when a fault does not exist. The resistance of the resistor-fuse circuit 404 is greater than the resistance of the of the ESSD 408, more specifically, than the resistance of closed contacts 410 of the ESSD 408. The balance resistors are sized such that a majority (e.g., 95%) of the source current $I_S$ flows through the contacts 410 when closed and the remainder (e.g., less than or equal to 5%) of the source current $I_S$ flows through the fuses. Current through the fuses is represented as $I_F$. As an example, the resistance of the one or more balance resistors may be 0.5-2.0 milliohms (mΩ). The ESSD 408 includes the contacts 410 (also referred to as a pair or set of contacts) and a coil 412, which when energized closes the contacts 410. The ESSD 408 may be implemented as a CB, a contactor, or a fast mechanical switch (FMS).

An overload protection module (OPM) 414 may be included and detects the source current $I_S$ via a current sensor 416 and/or current through the contacts $I_K$ via a current sensor 418. The source current $I_S$ is the current supplied from the power source to the loads via the HFPC 400. The OPM 414 deenergizes the coil 412 to open the contacts 410 when i) the source current $I_S$ and/or the current through the contacts $I_K$ exceed respective predetermined current thresholds, and/or ii) a predetermined energy threshold is exceeded. When the energy through the contacts 410, represented as $I^2t$ exceeds the predetermined energy threshold, the contacts 410 are opened, where I is equal to $I_S$ and/or $I_K$ and t is time. When the current level through the contacts 410 is too high and/or when a high amount of current is provided for a long time, a fault is detected and the contacts 410 are opened. The current level threshold is dependent on the current limits of the loads. The length of time is dependent on the length of time that the ESSD and/or loads are able to experience overcurrent loading. The opening of the contacts 410 causes the current to go through the fuses $F_{1-N}$, which will cause the fuses $F_{1-N}$ to melt, and result in arcing at the fuses $F_{1-N}$. The arcing at the fuses $F_{1-N}$ drives the current $I_F$ to zero. The low-voltage across the resistor-fuse circuit 404 due to the fault current $I_S$ flowing as fuse current $I_F$ prevents the contacts 410 from arcing.

During normal operation and when under load, the contacts 410 are closed and carry a continuous load current $I_L$. There is negligible loss in the balance resistors because current $I_F$ through the fuses is approximately equal to zero. When a fault occurs, the OPM 414 opens the contacts and transfers the fault current to the fuse, which clears the fault. In one embodiment, the OPM 414 is implemented as an analog circuit including a current transducer, and when current exceeds a threshold, the analog circuit deenergizes the coil 412 and opens the contacts 410. In another embodiment, the OPM 414 is implemented as a digital circuit and/or processor, that may calculate a current $I^2t$, and when an $I^2t$ threshold is exceeded, deenergize the coil 412 and open the contacts 410.

The ESSD 408 includes the contacts 410, which are normally open. During startup of the HFPC 400, power is supplied to the ESSD 408 to close the contacts and thus "arm" the ESSD 408. The ESSD 408 remains in an armed state when the contacts 410 are in a closed state. If the load current $I_L$ is able to flow through an intact (unmelted) fuse $F_{1-N}$, then the ESSD 408 opens the contacts 410 at zero voltage (i.e., when power is removed from the ESSD 408).

As an example, a normal load current through the ESSD 408 may be 3000 A and when a fault exists, current may suddenly increase to 5000 A. If the current remains at 5000 A for 2 ms, then the ESSD 408 may open the contacts 410. Thus, when the current exceeds a predetermined threshold for a predetermined period of time, the contacts 410 may be opened. As the level of current increases, the amount of time to trigger opening the contacts decreases.

The fuses $F_{1-N}$ are able to be easily defined for each application of use. The characteristics of the fuses $F_{1-N}$, such as the resistance, the size, the material(s), the number of fuses connected in parallel, peak voltage, overload voltage, overload withstanding duration (or melting time of fuses), operating current level, etc., are selected based on the full system operating voltage, system operating current levels, duration of fault, and tripping speed of the ESSD 408. In an embodiment, the fuses $F_{1-N}$ are selected to satisfy an $I^2t$ threshold. For example, the fuses may be selected to withstand a predetermined higher level of power for a predetermined period of time. The pre-arc duration of the fuses $F_{1-N}$ is coordinated with the opening speed of the contacts 410 of the ESSD 408. The fuses $F_{1-N}$ may be selected to withstand the full system voltage and reach a peak arc voltage of 150% of a rated system voltage. As an example, a fuse for a 3000 volt (V) system is arcing, the arc voltage may be 4000-5000 V after the fuse melts. The fuses $F_{1-N}$ therefore clear the fault current and protect the load(s) from damaging current levels, voltage levels, and $I_2t$ levels. The ESSD 408 does not actively clear the fault, but rather transfers fault current to the fuses $F_{1-N}$. The fuses $F_{1-N}$ are selected to clear a fault within system voltage limits, and before current and/or $I^2t$ limits of the HFPC 400 and downstream loads 106, 216, 314, conversion circuit 307, and energy ESMs 306 are exceeded.

In an event of a fault, the fuses $F_{1-N}$ are selected to not melt and/or be blown until after the contacts of the ESSD 408 are separated further than a minimum arc restrike distance (ARD). This is done to prevent the ESSD 408 from interrupting the fault current and experiencing arcing. The contacts 410 of the ESSD 408 start to open and the inrush of current due to the fault flows through the fuses $F_{1-N}$. Subsequent to the fuses $F_{1-N}$ blowing to interrupt the fault current, the contacts 410 become separated further than the minimum ARD without arcing and are able to block i) a maximum fuse arcing voltage and ii) a maximum system supply voltage. In the fully open position, the contacts are able to block the maximum system supply voltage and the maximum fuse arcing voltage. When the fuses $F_{1-N}$ melt and start arcing they dissipate the energy associated with the fault to clear the fault. The fuses $F_{1-N}$ are specifically selected as slow blowing fuses and the ESSD 408 is configured to open the contacts at a high-speed upon detection of a fault. As an example, the contacts 410 may require 2.0-3.0 milliseconds (ms) to separate further than the minimum ARD and the fuse $F_{1-N}$ may finish melting and start to arc after 4.0 ms and clear the fault after 8.0 ms. Thus, there is coordination between the opening characteristics of the contacts and the fuse melting time, such that the fuses $F_{1-N}$ do not blow prior to the contacts having separated further than the minimum ARD. A minimal number of fuse(s) (e.g., 2-4) may be connected in parallel and used in the HFPC 400. Due to the configuration of the HFPC 400, the fuses $F_{1-N}$ do not experience thermal cycling and thus the fuses $F_{1-N}$ do not need to be derated from 100% to a lower percentage (e.g., 80%, 60%, or 40%) in order to survive a longer period of time, as would be the case in a fuse only fault protection circuit.

When the resistor-fuse circuit 404 is intact, there is no voltage across the contacts 410 when the contacts 410 are closed and begin to separate and thus there is no arcing experienced at the ESSD 408. When the contacts 410 begin to separate, the resistance across the contacts 410 increases to be significantly larger than the resistance of the resistor-fuse circuit 404. This change in resistance causes source current to flow through the resistor-fuse circuit 404 and prevents arcing across the contacts of the ESSD 408.

The contacts 410 and operating coil 412 of ESSD 408 may be implemented as part of or be replaced by a fast mechanical switch that is controlled by the OPM 414. The contacts 410 may have low mass and a strong opening mechanism such that when the coil 412 is deenergized the contacts begin to separate with very short delay (e.g., 2-3 ms) and accelerate rapidly (e.g. 5 m/s) to ensure that when the fuse has melted the arc voltage of the fuse will not exceed the minimum ARD between the contacts and therefore will not cause an arc to strike between the contacts 410.

The current sensors 416, 418 may measure current at locations between a power source and a load where a fault current is likely to occur. As the contacts 410 begin to open, fault current $I_K$ is smoothly transferred to the low impedance fuse, causing it to rapidly accept the entire fault current as $I_F$. The voltage drop across the unmelted fuse (still in the pre-arc stages) and $R_{bal}$ is small enough that it is not possible for the contacts 410 to arc. This greatly reduces the size and cost of the ESSD 408 and may allow use of a simple contactor or fast mechanical switch. The contacts 410 do not require any means to dissipate an arc, such as the arc chute of a conventional CB.

Figure 5:
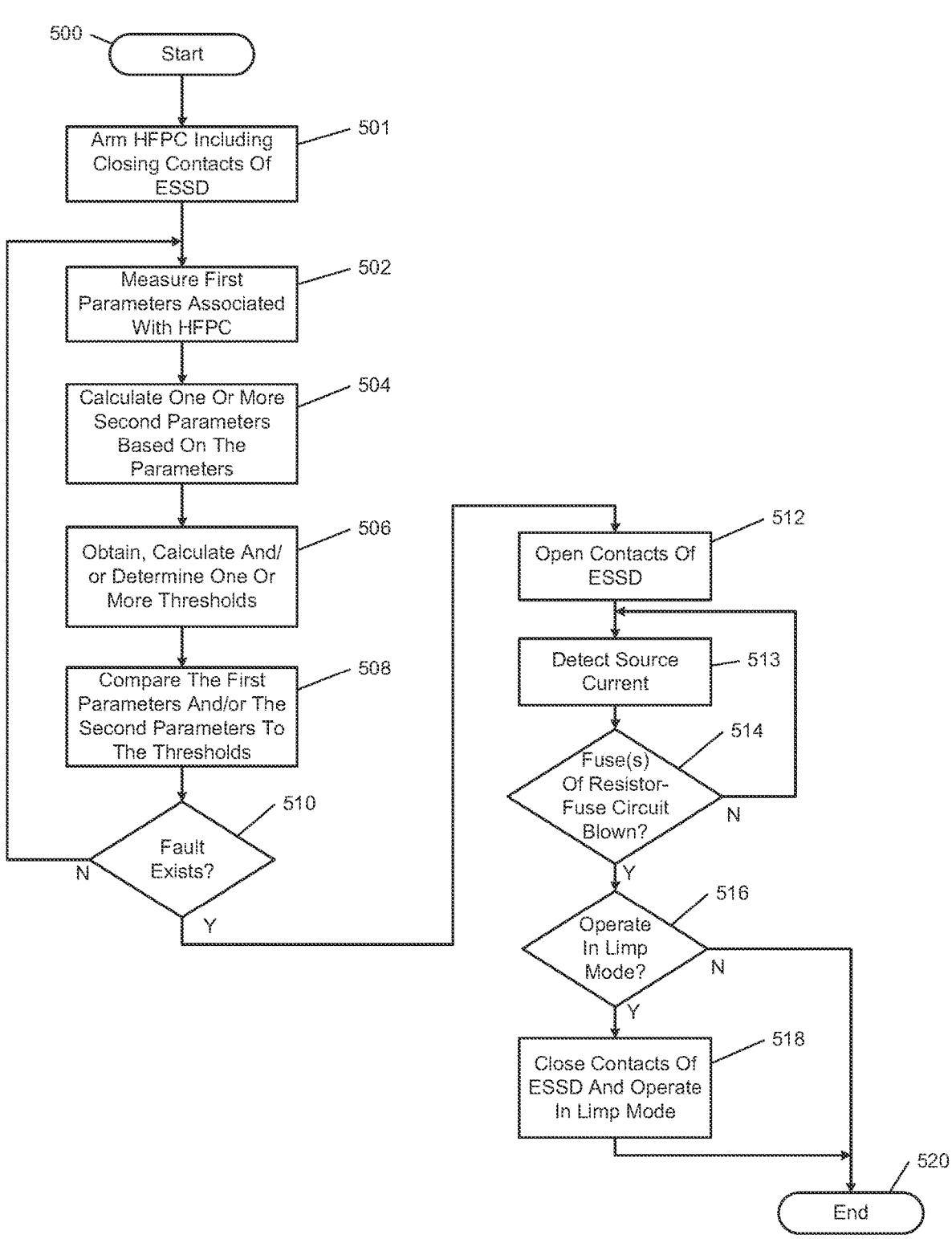
FIG. 5 illustrates a method of operating an HFPC in accordance with the present disclosure.

FIG. 5 illustrates a method of operating an HFPC (e.g., the HFPCs of FIGS. 1-4). The operations of FIG. 5 may be iteratively performed. The operations may be performed by, for example, the HFPC 400 of FIG. 4.

The method may begin at 500. At 501, the OPM 414 arms the HFPC 400 by closing the contacts 410 to allow a majority of current to pass through the ESSD 408 instead of through the fuses $F_{1-N}$.

At 502, first parameters associated with the HFPC 400 are measured, such as current levels and/or other parameters. The current levels may be measured via current sensors (e.g., the current sensors 416, 418).

At 504, second parameters may be determined based on the first parameters. For example, a current energy level $I^2t$ may be determined based on the measured current.

At 506, one or more thresholds may be obtained (e.g., looked up), calculated, and/or determined. As a few examples, a source current threshold, a contact current threshold, an energy threshold, and/or a temperature threshold may be obtained, calculated and/or determined.

At 508, one or more of the first parameters and/or one or more of the second parameters are compared to the thresholds to determine whether a fault exists. At 510, it is determined whether a fault exists. If a fault exists, operation 512 is performed, otherwise operation 502 is performed. This may occur, for example, when: the source current and/or the contact current exceed one or more current thresholds; the energy through the contacts exceeds an energy threshold for a monitored period of time; and/or a detected temperature exceeds a predetermined temperature (e.g., 85-200° C.).

At 512, in response to detecting a fault, contacts of ESSD 408 are opened to transfer current to the fuses $F_{1-N}$. The OPM 414 may deenergize the coil 412 to open the contacts 410. At 513, the OPM 414 detects the source current $I_S$. At 514, the OPM 414 determines whether the fuses Fare blown.

When blown, the fuses interrupt the fault current. When the source current $I_S$ is zero, operation 516 may be performed, otherwise operation 513 may be performed.

At 516, the OPM 414 or other control module, such as a vehicle control module, may determine whether to operate in a limp mode. If yes, operation 518 may be performed, otherwise the method may end at 520.

In a traditional system having a fault protection circuit with only fuse(s), if the fuse(s) are blown, then no power is being supplied by the corresponding power source (e.g., overhead trolley lines) to a load. With the configuration of the disclosed HFPC 400, the contacts 410 are able to be closed to allow power from the corresponding power source to be supplied through the HFPC 400 after the fuses F1-N have blown to power, for example, vehicle motor(s) to drive a corresponding vehicle to a service station for service. This may occur at 518 and may be based on: a stored flag permitting limp mode operation; a system request; and/or a user input requesting operation in the limp mode. The vehicle may be operation limited while operating in the limp mode. The current drawn from the power source may be limited, the speed of the vehicle may be limited, the voltage supplied to the output of the HFPC 400 may be limited (e.g., a predetermined percentage, such as 30% or 50%, of full power voltage), etc.

The above-described operations are meant to be illustrative examples. The operations may be performed sequentially, synchronously, simultaneously, continuously, during overlapping time periods or in a different order depending upon the application. Also, any of the operations may not be performed or skipped depending on the implementation and/or sequence of events.

The above-described examples include HFPCs that include ESSDs that shield fuses from large, cyclic variations in load current that would prematurely shorten the lifetime of the fuses and/or greatly increase the required number of fuses. As a result, a fuse with a nominally small current rating is able to protect the load from damage and allow the ESSD 408 to open at low contact voltages without arcing. The disclosed examples include smaller, lighter, and less expensive protection circuits than conventional high-speed, high-voltage circuit breakers with bulky arc chutes and large clearance requirements to adjacent equipment. In applications where multiple parallel fuses may be used, the HFPCs require fewer fuses and allow for a smaller fault current to pass before the fault is cleared, improving protection and reducing cost. The examples disclosed herein are applicable to various industrial applications.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

Although the terms first, second, third, etc. may be used herein to describe various converters, circuits, groups, ESMs, reactors, and/or other elements, these converters, circuits, groups, ESMs, reactors, and/or other elements should not be limited by these terms, unless otherwise indicated. These terms may be only used to distinguish one converter, circuit, group, ESM, reactor, and/or element from another converter, circuit, group, ESM, reactor, and/or element. Terms such as "first," "second," and other numerical terms when used herein may not imply a sequence or order unless clearly indicated by the context. Thus, a first converter, circuit, group, ESM, reactor, and/or element discussed herein could be termed a second converter, circuit, group, ESM, reactor, and/or element without departing from the teachings of the example embodiments.

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language

15

5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. A hybrid fault protection circuit comprising:
an input configured to receive power from a power source;
an output configured to output power to one or more high-power cyclical loads;
a resistor-fuse circuit comprising
one or more resistors, and
one or more fuses collectively being connected in series with the one or more resistors;
an electrically-controlled safety switching device comprising a coil and contacts, the contacts connected in parallel with the resistor-fuse circuit; and
an overload protection module configured to
arm the hybrid fault protection circuit by energizing the coil and closing the contacts to supply load current from the input to the output via the contacts when a fault downstream from the hybrid fault protection circuit does not exist,
detect a fault downstream from the hybrid fault protection circuit, and
in response to detecting the fault, open the contacts to cause fault current to pass through the one or more fuses and not across the contacts.

2. The hybrid fault protection circuit of claim 1, wherein the one or more resistors comprise a plurality of resistors.

3. The hybrid fault protection circuit of claim 1, wherein impedance of the resistor-fuse circuit is higher than impedance of the contacts when closed such that a majority of current passing from the input to the output passes through the contacts when closed.

4. The hybrid fault protection circuit of claim 1, wherein impedance of the resistor-fuse circuit is higher than impedance of the contacts when closed such that 95% or more of current passing from the input to the output passes through the contacts when closed.

5. The hybrid fault protection circuit of claim 1, wherein the electrically-controlled safety switching device is implemented as a circuit breaker, a contactor, or a fast mechanical switch.

6. The hybrid fault protection circuit of claim 1, wherein the one or more fuses comprise a plurality of fuses connected in parallel.

7. The hybrid fault protection circuit of claim 1, further comprising one or more current sensors configured to detect at least one of source current from the input and contact current through the contacts,
wherein the overload protection module is configured, based on the at least one of the source current from the input and the contact current through the contacts, to detect the fault.

8. The hybrid fault protection circuit of claim 1, wherein a melt time of the one or more fuses is longer than at least one of i) time for the contacts to separate further than a minimum arc restrike distance (ARD), and ii) time for the overload protection module to cause the contacts to separate further than the minimum ARD.

9. The hybrid fault protection circuit of claim 1, wherein the overload protection module is configured, subsequent to detecting the fault and causing the contacts to separate beyond the minimum ARD, to determine whether to operate in a limp mode, and in response to determining to operate in the limp mode, reclose the contacts.

16

10. A machine comprising:
a direct current (DC) link including a plurality of DC link rails;
the hybrid fault protection circuit of claim 1, wherein the output of the hybrid fault protection circuit is connected to the DC link; and
the one or more high-power cyclical loads receiving power from the DC link.

11. The machine of claim 10, further comprising one or more power sources supplying power to the DC link.

12. The machine of claim 11, wherein the one or more power sources comprise at least one of an engine and a power storage module.

13. The machine of claim 10, further comprising a trolley pantograph connected to the input and configured to receive power from overhead trolley lines.

14. A power supply system comprising:
the hybrid fault protection circuit of claim 1; and
one or more substations supplying power to the input of the hybrid fault protection circuit via overhead trolley lines.

15. A vehicle comprising:
the hybrid fault protection circuit of claim 1;
the power source supplying power to the hybrid fault protection circuit; and
the one or more high-power cyclical loads receiving power from the output of the hybrid fault protection circuit.

16. The vehicle of claim 15, wherein the power source is an engine, a power storage module or a trolley pantograph.

17. A method of operating a hybrid fault protection circuit, the method comprising:
arming the hybrid fault protection circuit, wherein the hybrid fault protection circuit comprises an electrically-controlled safety switching device connected in parallel with a resistor-fuse circuit, the electrically-controlled safety switching device comprising a coil and contacts, the resistor-fuse circuit comprising one or more resistors collectively connected in series with one or more fuses, and the arming of the hybrid fault protection circuit including energizing the coil to close the contacts and supply load current through the contacts to one or more high-power cyclical loads;
detecting at least one parameter of the hybrid fault protection circuit;
comparing the at least one parameter to at least one threshold to detect a fault downstream from the hybrid fault protection circuit; and
in response to detecting the fault, opening the contacts of the electrically-controlled safety switching device to cause fault current to pass through the one or more fuses and not across the contacts.

18. The method of claim 17, wherein the at least one parameter includes at least one of source current and current through the contacts.

19. The method of claim 17, wherein the at least one threshold includes a current threshold and an energy threshold.

20. The method of claim 17, further comprising:
detecting source current supplied to the hybrid fault protection circuit;
based on the detected source current, determining whether the one or more fuses are blown; and
in response to detecting the one or more fuses are blown, operating in a limp mode including closing the contacts to allow current to pass from an input of the hybrid fault protection circuit to an output of the hybrid fault protection circuit.

* * * * *